Sept. 12, 1967   J. BULTHEEL ETAL   3,341,225
ANGULARLY RESPONSIVE LOAD RELEASE
Filed Oct. 24, 1965   3 Sheets-Sheet 1

Inventors
JEAN BULTHEEL &
JEAN-CLAUDE VAN DEST
By Tweedale & Gerhardt
Attorneys

Sept. 12, 1967   J. BULTHEEL ETAL   3,341,225
ANGULARLY RESPONSIVE LOAD RELEASE
Filed Oct. 24, 1965   3 Sheets-Sheet 2

Inventors
JEAN BULTHEEL &
JEAN-CLAUDE VAN DEST
By
Tweedale & Gerhardt
Attorneys

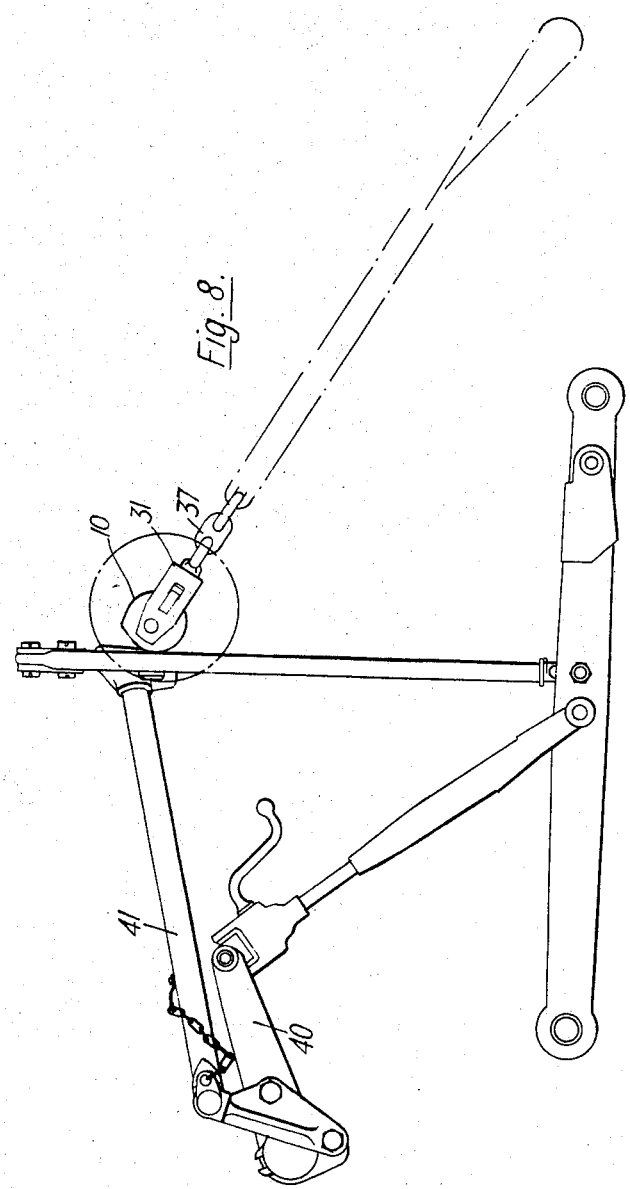

United States Patent Office 3,341,225
Patented Sept. 12, 1967

3,341,225
ANGULARLY RESPONSIVE LOAD RELEASE
Jean Bultheel, Taverny, and Jean-Claude Van Dest, Ezansville, France, assignors to Massey-Ferguson S.A., Paris, France
Filed Oct. 24, 1965, Ser. No. 504,947
Claims priority, application Great Britain, Oct. 27, 1964, 43,714/64
8 Claims. (Cl. 280—449)

This invention relates to load transmitting assemblies and more particularly to load transmitting assemblies adapted to release upon changes in the direction of the load transmitted.

In certain load transmitting applications, it is desirable to provide for automatic release of the load upon changes in the direction of the load. Such a situation can exist in tractor-trailer hitch arrangements wherein the hitch transfers weight from the trailer or other pulled device to the tractor and a separate draw bar provides the draft connection between the tractor and pulled device. In such an arrangement it is desirable to release the weight transfer connection upon breakage or other release of the draft connection since the draft load is usually so high that if it were transferred to the weight transfer hitch a dangerous condition acting to tip the tractor over backwards could result.

One reliable means of detecting the breakage or release of the normal draft connection between the tractor and pulled device is to measure changes in angular relation in the weight transfer hitch. Thus, release of the draft connection allows the trailed device to fall back away from the tractor changing the angular relation therebetween. Since normal operation requires a limited amount of relative angular change between the tractor and trailed device, the release should come about only after a substantial angular change.

Since tractors are usually hitched to various different vehicles and implements, the initial angular relationship may be different in each case.

It is, therefore, an object of the invention to provide a load transmitting apparatus that is releasable upon changes in the direction of the transmitted load.

It is a further object of the invention to provide a load transmitting device that automatically adjusts itself to angular conditions of various installations and provides for automatic release of the load upon a predetermined deviation in the angular condition.

These and other objects and advantages will be readily apparent from the following description of a representative example and accompanying drawings thereof and in which:

FIG. 8 is a side elevation of a load-transmitting assembly incorporated in a tractor-implement hitch.

Figure 4:
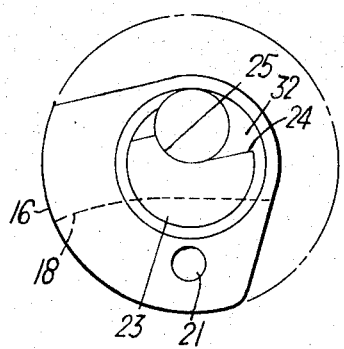
FIGS. 4, 5 and 6 are detail views of parts shown in FIGS. 2 and 3.
Figure 5:
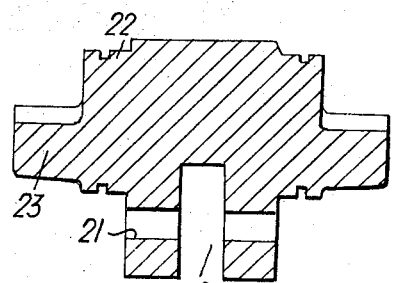
Figure 6:
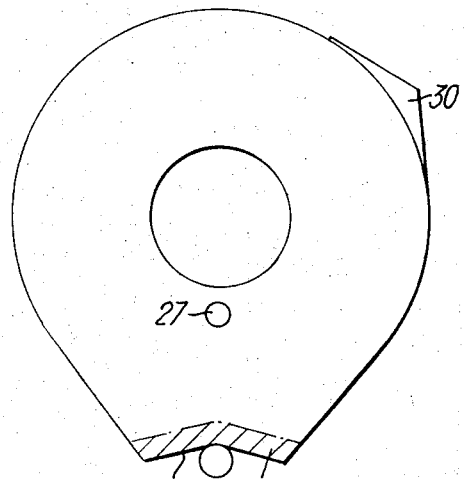

Referring to the dawings, the load transmitting assembly includes a housing, generally indicated at 10 (FIGURE 3), having an annular portion 11 and a projecting lug 12 provided with a hole 13 housing a pin 14 by means of which one load carrying member may be attached to the housing 10. Rotatable within the housing 10 is a member, generally indicated at 15, having an arcuate outer surface 16 (FIGURE 4) of substantially the same diameter as the hole 17 in the annular portion 11. A notch 18 (FIGS. 4 and 5) in the member 15 carries a roller 19 supported on a pin 20 passing through the roller and through holes 21 in the member 15. Each side of the member 15 projects beyond the housing 10 and includes a circular portion 22 and a lug 23. Each lug 23 is provided with a cam surface having at flat face 24 forming a continuation from an arcuate face 25 (see FIGS. 3 and 4).

A plate 26 is mounted on each circular portion 22 and the pin 20 passes through a hole 27 in each plate. Each plate 26 includes a projecting part 28 having a V-shaped surface 29 and an abutment portion 30.

Figure 1:
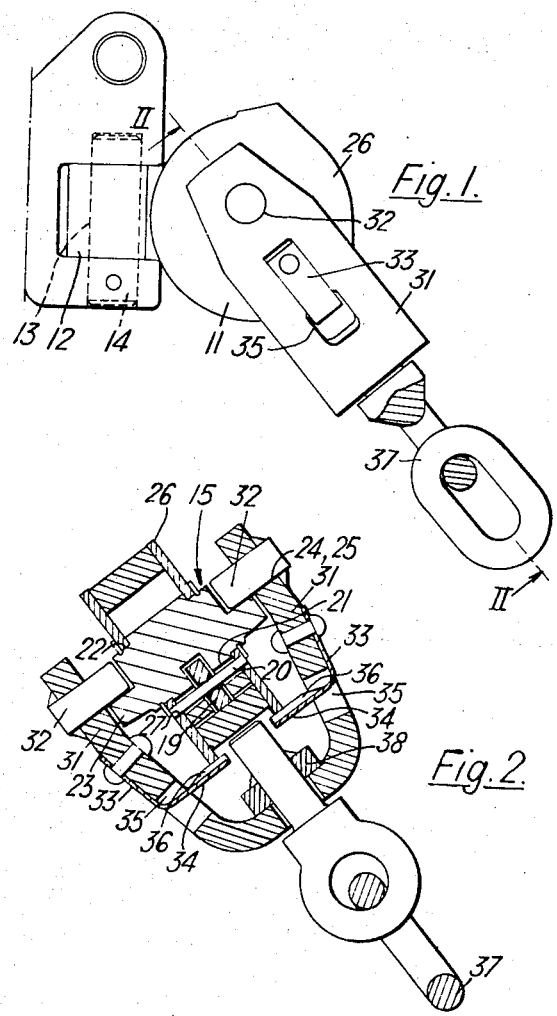
FIG. 1 is an external side elevation of a load transmitting assembly.
Figure 2:
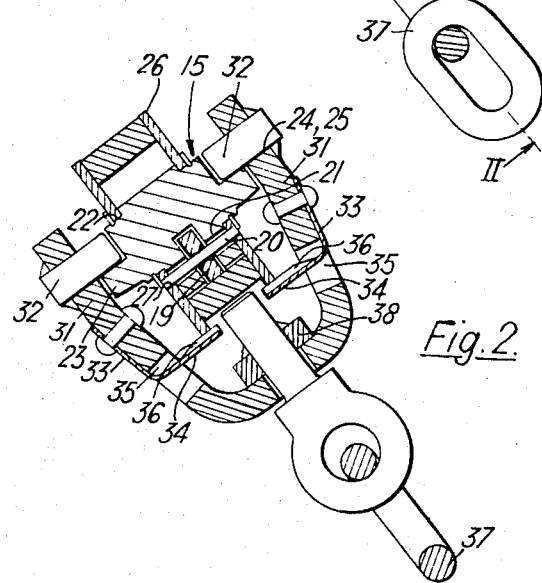
FIG. 2 is a section on the line 2—2 of FIG. 1.
Figure 3:
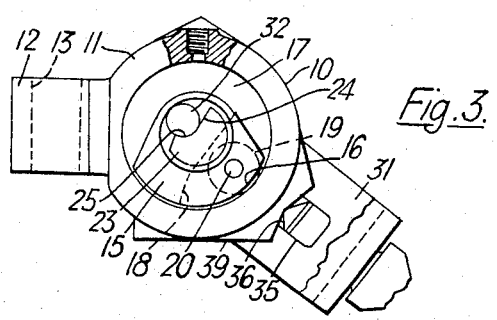
FIG. 3 is a fragmentary, part-sectional view of FIG. 1.

As seen in FIGURE 3, a V-shaped strap 31 fits around the assembly and carries an inwardly projecting pin 32 at each open end of the V, adapted to rest on the faces 24, 25 as shown in FIG. 3. Fitted to the outer side of each leg of the strap 31 is a leaf spring 33 having an end 34 bent at right angles inwardly to pass through a hole 35 in the strap and including a face 36 which is located in the V-shaped groove 29 of the nearest plate 26. The other load-carrying element in the embodiment, a chain 37 is secured to the strap 31 at 38.

In operation, and with little or no load on the chain 37, any angular movement of the chain is transmitted through the strap 31 and springs 33 to the plate 26, thus causing them to rotate. Since the plates 26 are connected through the pin 20 to the member 15, this is also rotated. In this connection it will be noted that any chain force is acting directly in line with the center of the housing 10 and the pin 20 (see FIG. 7). Also, the roller 19 projects slightly beyond the surface 16 so that only slight resistance to this rotation will be present.

When a load is applied to the chain, the pin 20, which is made of spring steel, will deform slightly and after a set load is applied, this deformation will be sufficient to cause the roller 19 to have retracted and the whole of the surface 16 will then be in contact with the inner face of the housing 10. After this load is achieved, the frictional resistance to rotation will be sufficient to prevent further rotation of the member 15, and if the chain angle now changes with the load still present, the faces 36 of springs 33 will ride up the grooves 29 in plates 26.

FIG. 3 illustrates the conditions prevailing after the chain 37 has attained its initial angular position. Under this condition, the pins 32 are resting on the faces 24, 25 and, as can be clearly seen from FIG. 7, the force F acting on the mechanism due to chain tension is in a direction in which the pins tend to remain in position. The line 10—10 represents the normal to the force F and hence the angle A represents the "slope" of the face 24. This angle will be the same under all normal operating conditions as the assembly will rotate into this position under light load and will lock in this position when heavy load is applied.

Figure 7:
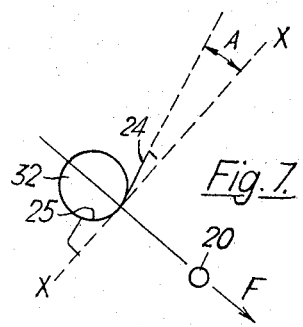
FIG. 7 is a diagrammatic representation illustrating the operation of the assembly.

If now the chain 37 tends to attain a more horizontal position, as viewed in the drawings, with the load still applied, then as soon as the chain has rotated through an angle equal to the angle A from the position of FIG. 7, the force will be normal to the faces 24 and any further rotation will cause the pins 32 to ride along the faces and become detached. The chain 37 together with the strap 31, pins 32, and springs 33 then fall clear of the assembly so that the load is no longer transmitted. The same sequence of events would occur if the other load-carrying element underwent angular movement relative to the chain 37.

To replace the strap 31, the pins 32 are placed on the faces 24, 25 with the strap 31 situated anti-clockwise, as seen in FIG. 3, from the grooves 29. The assembly is then rotated until the abutment 30 contacts the lug 12 when further rotation causes the springs 33 to ride up the inclined faces 39 and snap into the grooves 29.

FIG. 8 illustrates the assembly incorporated in a tractor-implement hitch. The implement and tractor are connected together by two low-level drawbars (not shown), one on the tractor and the other on the implement or pulled device, and in addition the tractor power lift applies a lifting force to the implement drawbar through arms 40 and first and second load-carrying elements in the form of a frame 41 and the chain 37.

During normal operation, the lifting force is transmitted from the frame 41 to the chain 37 through the load-transmitting assembly which is in its locked position. Angular movement of the chain 37 towards a more horizontal position from the position in which locking occurred may take place without causing release of the assembly provided such movement is less than the angle A. If, however, the angular movement exceeds the angle A, then the frame 41 and chain 37 are automatically disconnected as described above. Such excessive angular movement may occur for example, if the two drawbars are disconnected without disconnecting the chain 37, or if one drawbar breaks or the pin connecting the drawbar breaks. In such circumstances, the tractor will move away from the trailed device and the chain will tend to attain a more nearly horizontal position. The trailer thus imposes a force through the chain 37 and frame 41 on a relatively high point on the tractor so that there is a danger that the tractor may overturn backwards. However, once the angular movement of the chain exceeds the angle A, the frame 41 and chain 37 are disconnected thus disconnecting the tractor and trailer completely and preventing overturning of the tractor.

The angle A must be sufficient to prevent the release mechanism working during normal operation, when the angle does alter slightly as a result of ground contour variations. In the embodiment shown, this movement will not exceed about 5 degrees and a suitable value for the angle A is 10–20 degrees.

The embodiment has the advantage that regardless of the angle at which the chain is attached to the implement, the assembly will always allow the chain to become detached after it has moved a predetermined angle from the position in which locking occurred.

In a modification, the roller 19 may be of hard rubber or other slightly deformable material.

The use of the load-transmitting assembly is not, of course, confined to tractor-implement hitches.

The illustrated application is shown in a weight transfer hitch assembly of the type fully shown and described in our co-pending application S.N. 504,966 entitled Weight Transfer Tractor Hitch, filed Oct. 24, 1965.

Other applications, changes and modifications will be readily apparent to those skilled in the art and are deemed to be within the scope of this invention which is limited only by the following claims.

We claim:
1. A load transmitting assembly including first and second releasably interconnected members connectible respectively to elements between which the load is to be transmitted and angularly movable relative to each other, locking means freely movable under control of the members when no force is being transmitted and automatically lockable on application of a force, and means for over-riding said locking means and disconnecting said members when the angle between them varies by a predetermined amount from the angle at which they are disposed when the force is applied.

2. A load transmitting assembly according to claim 1 in which said locking means includes first and second relatively rotatable members connected one to each element between which load is to be transmitted and having adjacent complementary faces, and means spacing said faces apart and deformable under load to permit said faces to move into frictional engagement to lock said members together on application of a predetermined load.

3. A load transmitting assembly according to claim 2 in which said deformable means includes a roller carried by one of said members and engaging said face of the other member.

4. A load transmitting assembly according to claim 3 in which said means for over-riding said locking means includes a cam carried by a member of said locking means and a follower engaging said cam and connected to one of said elements between which load is to be transmitted.

5. A releasable load transmitting assembly including first and second load carrying members, an intermediate member for connecting said members, said intermediate member mounted for angular movement relative to both said first and seecond members, first cooperating means on said second and intermediate members for transmitting a linear load therebetween, locking means for preventing relative angular movement between said seecond and intermediate members when a substantial load is transmitted therebetween and permit free relative angular movement therebetween when little or no load is transmitted therebetween, second cooperating means on said first and intermediate members for transmitting linear load therebetween when they are angularly aligned relative to each other in a predetermined range and releasable upon relative angular movement between said first and intermediate members beyond said range.

6. The releasable assembly of claim 5 wherein said first cooperating means comprises normally spaced adjacent surfaces on said seecond and intermediate members and said locking means includes a deformable member normally spacing said surfaces and deformable under linear load, said surfaces acting to frictionally prevent relative angular movement between said second and intermediate members when in engagement.

7. The releasable assembly of claim 6 wherein said second cooperating means includes cooperating surfaces on said first and intermediate members, one of said surfaces formed as a cam surface and the other surface as a cam follower, said cam surface acting to transmit linear load to said follower only when said first and intermediate members are angularly aligned in said predetermined range.

8. The releasable assembly of claim 7 wherein spring means are provided between said first and intermediate members to hold the same in axially linear load transmitting alignment and simultaneously preventing relative angular movement between said first and intermediate members, said spring means being releasable by cam action between said cam and follower.

References Cited

UNITED STATES PATENTS

| | | | |
|---|---|---|---|
| 1,798,979 | 3/1931 | Grimsrud | 280—452 |
| 1,911,743 | 5/1933 | Boda | 280—452 |
| 3,062,561 | 11/1962 | Wulff et al. | 280—405 |

LEO FRIAGLIA, *Primary Examiner.*